Nov. 7, 1944.  D. P. BERNHEIM  2,361,910
OPHTHALMIC MOUNTING
Filed Feb. 6, 1942
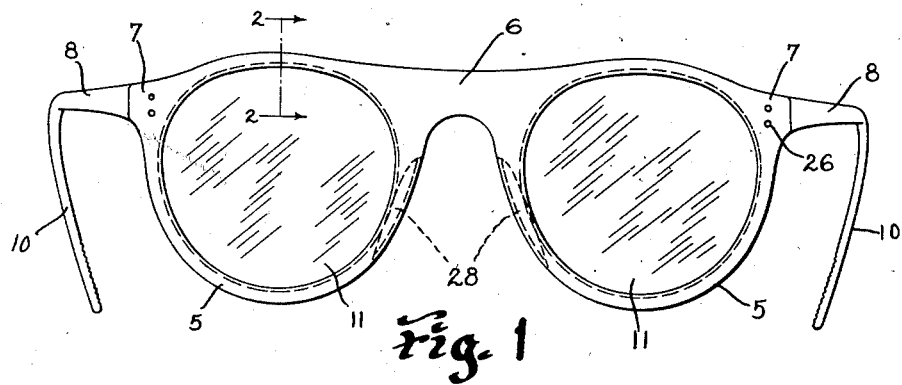
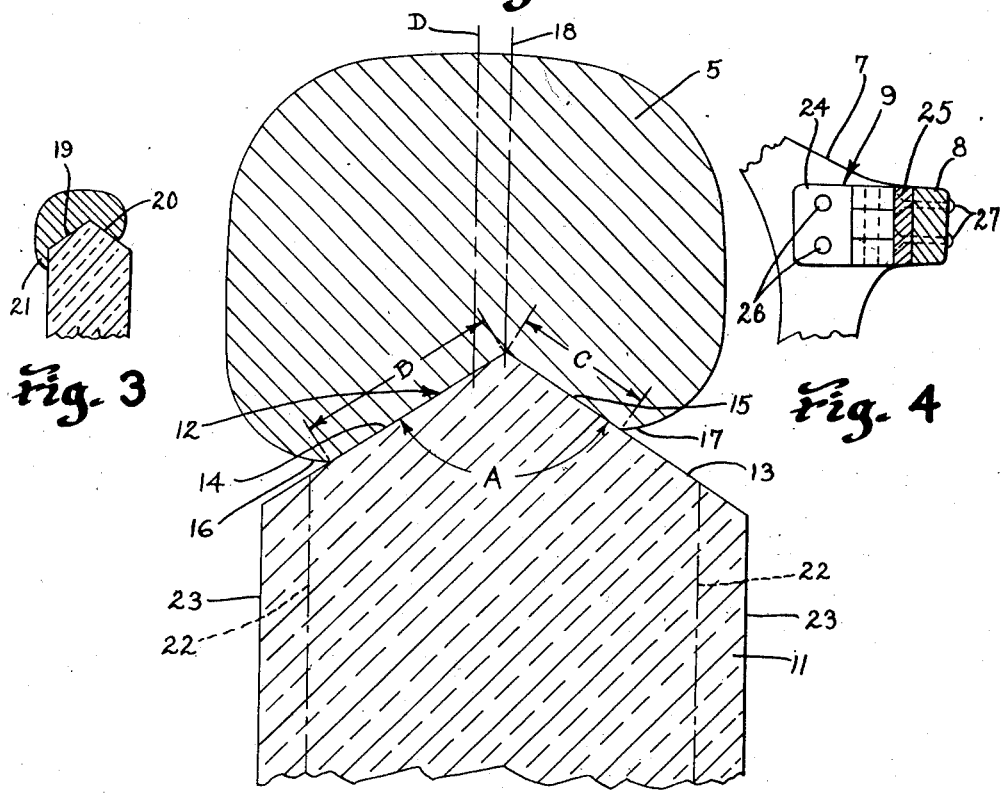
DANIEL P. BERNHEIM
INVENTOR
BY Louis L. Gagnon
ATTORNEY Patented Nov. 7, 1944

2,361,910

UNITED STATES PATENT OFFICE 2,361,910

OPHTHALMIC MOUNTING

Daniel P. Bernheim, Southbridge, Mass., assignor to American Optical Company, Southbridge, Mass., a voluntary association of Massachusetts Application February 6, 1942, Serial No. 429,712

2 Claims. (Cl. 88—47)

This invention pertains to improvements in ophthalmic mountings and has particular reference to a safety type mounting.

One of the principal objects of the invention is to provide an ophthalmic mounting having a backing support for the lenses when in position in the lens rims of the mounting whereby the supported lenses will be more resistant to impact.

Another object of the invention is to so arrange and relate the lenses with the lens receiving grooves in the rims that the said grooves will have an increased supporting area in the rear of the lenses and the bevelled edges of the lenses will have a more intimate fit with the V-shaped grooves of the rims.

Another object is to provide a shrunk-on rim construction having the above characteristics which, because of the relatively intimate relation of fit of the bevel of the lenses with the V-shaped grooves of the rims, may be shrunk on said lenses without danger of having the rims displaced or distorted in a sidewise direction when in final fitting relation with the lenses.

Another object is to provide novel means of accomplishing the above results.

Other objects and advantages of the invention will become apparent from the following description taken in connection with the accompanying drawings and it will be understood that several modifications of the invention may be made without departing from the spirit of the invention as expressed in the accompanying claims. I therefore do not desire to be limited to the exact details of construction and arrangement of parts shown and described as, the preferred form only has been given by way of illustration.

The mounting embodying the invention is designed particularly for protection use particularly in instances when the individual wearing the mounting is exposed to injuries from flying particles or the like and it is particularly designed to resist rough usage. Ophthalmic mountings in general are designed to have a pleasing slender appearance which in many instances in the past caused a sacrifice of rigidity of parts particularly in the supporting of the lenses in the lens rims. Although such prior art mountings, for ordinary use, performed the full extent of their desired function, it has been found that in instances when mountings of this character are to be used for protection wear in explosive plants or the like, the above sacrifice due to attempting to attain a slender and pleasing appearance of the various parts had to be overcome by strengthening these parts at the various strategic points throughout the mounting.

A difficulty with many prior art mountings of this nature is that they do not properly retain the lenses in the lens rims so that they will resist impact from the front when the mounting is in position of use on the face. In the present invention, the lenses are of the commonly known hardened type which in themselves are much more resistant to impact and the lens rims which support said lenses have an increased bearing support in the rear thereof which affords much greater resistance to impact from the front and greatly reduces the tendency of having the lenses become dislodged from the rims during use.

It, therefore, is one of the primary objects of the present invention to obtain all of the advantages set forth above in a simple and efficient manner.

Referring to the drawing:

Fig. 1 is a front elevation of the mounting embodying the invention;

Fig. 2 is a greatly enlarged fragmentary sectional view taken as on line 2—2 of Fig. 1 and looking in the direction indicated by the arrows;

Fig. 3 is a view generally similar to Fig. 2 illustrating the modified form of the invention;

Fig. 4 is a fragmentary rear elevation view, partially in section, of the temple endpiece connection.

Referring more particularly to the drawing wherein like characters of reference designate like parts throughout the several views the mounting embodying the invention, Fig. 1 comprises a pair of lens rims 5 connected by a bridge member 6 and having endpiece members 7 to which the temples 8 are attached by a hinge member or the like 9.

The lens rims 5, bridge member 6 and endpiece members 7 are preferably formed in integral relation with each other by blanking or otherwise cutting said members from sheet material such as cellulose acetate, cellulose nitrate or from artificial plastics or resins such as methyl methacrylate or the like of the so-called polymeral materials which may be heated and expanded and which will tend, upon cooling to return to their original set. The bridge member 6 and endpiece member 7 in the present invention are increased as to surface area over the prior art mountings of this nature and also as to cross sectional dimension in order to provide increased strength and durability of said parts and to cause said parts to have a shield effect for the eyes when in position of use on the face.

In addition to the above, the increasing of the area of the endpiece member 7 affords a greater attachment area for the hinge members 9 whereby hinge members of larger size and greater strength may be used with the said endpiece members tending to conceal the said hinge members so as to render them substantially invisible when the mounting is viewed from the front.

The temples 8 may be of any of the conventional types. For example they may have ear gripping members 10 either in rigid or cable form or may be of the conventional skull gripping type.

The lenses 11 may be of glass or other materials such as methyl methacrylate or the like. In instances when the lenses are formed of glass they are preferably hardened so as to have a greater resistance to impact. The hardening thereof may be accomplished by any of the commonly known commercial hardening processes.

The lens rims 5 in the present invention differ from the prior art in that they have a V-shaped lens retaining groove 12 therein with the sides thereof so angularly disposed relative to each other that the angle therebetween is substantially equal to the angle A of the bevelled contour edge 13 of the lenses. The V-shaped groove 12 is so formed in the rim 5 that the rear section 14 thereof has a lens contacting dimension B much greater than the lens contacting dimension C of the front section 15 thereof. The lens contacting dimension C of the section 15 is substantially equal to that of the prior art type mountings while the lens contacting dimension B in so increased as to be considerably greater than the dimension C and is so controlled as to cover at least more than half of the adjacent edge area of the bevel 13 of the lens. This provides an increased backing support for the lens 11 so as to provide a greater resistance to impact from the front. It is to be noted that the rim 5 has a rear portion 16 which extends considerably below the front lower edge portion 17 of the rim.

The angle A between the bevelled edge surfaces 13 of the lens is substantially equal to the angle between the bevelled surfaces 14 and 15 of the groove in the rim. The purpose of so controlling the related angles is to prevent the rim 5 from twisting in a sidewise direction when the lens 11 is being secured therein.

The lens receiving groove 12 in the rim 5 is preferably formed to a circumferential dimension which is less than the circumferential dimension of the lens to be held therein and when the lens 11 is to be secured in said rim 5, the rim is first preferably heated and stretched an amount sufficient to permit the lens 11 to be placed therein from the front and seated against the bevelled portion 14 of the groove. When the lens 11 is in this relation with the rim, the rim is allowed to cool and contract through its inherent tendency to return to its initial set. The contraction of the rim, because of the fact that the groove is of a circumferential dimension less than the circumferential dimension of the lens, will tend to draw down on said lens and force the bevel 13 thereof into intimate relation with the V-shaped groove 12. Because of the fact that the angle of the groove 12 is substantially equal to the angle A of the bevel of the lens, there will be no tendency for the rim to twist in a sidewise direction as would be the case if said angles were not substantially the same. It is particularly pointed out that the apex of the V-shaped groove 12 in the rim is located forwardly of the vertical center line D of said rim as indicated by the dash line 18. The rim 5 therefore has a greater thickness dimension rearwardly of the dash line 18, which dash line 18, in the prior art would normally be the vertical center line of the rim.

The apex of the groove in the rim is not on the vertical center line but rather forward of said center line, so that the apex of the lens groove in the rim is eccentric. The inner peripheral edges of the front and rear surfaces of the groove are of different dimensions, with the front peripheral edge of the groove being of greater diameter than the peripheral edge of the rearward lip of the groove. It will therefore be seen that the diameter of the rear portion of the groove is smaller than the diameter of the peripheral edge of the front lip. Consequently, the rear peripheral edge being of a smaller diameter than the front peripheral edge there will be more rim stock for a bearing surface on one bevel of the lens, which is the rear bevel, than there will be on the front bevel. This increased built-up dimension of the rear section of the rim 5 in combination with the lower edge portion 16 greatly reinforce the rim against impact on the lens from the front and provides a much rigid and durable construction as well as affording much greater safety to the wearer.

It is known that in the prior art there have been lens grooves having one side of the bevel greater than the other side thereof but such dimensioning of the angled surfaces of the prior art grooves was for the purpose of permitting the lens to be snapped into the rims without requiring the heating and stretching of the rims. Contrary to applicant's invention the angled wall of the prior art lens grooves which was of greater dimension than the other wall thereof had no greater engaging area with the edge of the lens than the usual prior art lens rims while on the other hand the wall of less dimension was greatly cut down as compared with the wall of greater dimension so as to permit the lens to be snapped into the lens rim without having to heat or stretch. This did not afford greater resistance to impact from the front as is accomplished by applicant's device. It is to be noted that applicant's lens rims, when viewed from the front, are apparently no greater in dimension than prior art lens rims of mountings of this type and that the built-up rear portions of the rims with the longer bevelled surface in the rear thereof will not be readily distinguishable when the mounting is viewed from the front. In appearance the rims of applicant's device, as compared with conventional lens rims of mountings of a similar nature while affording greater strength and resistance to impact, will appear as being no larger than the usual prior art rims when the mounting is viewed from the front.

It is also pointed out that the increasing of the width of the rear bevelled surface of the groove 12 will not restrict the field of vision through the lenses. The angle of vision through the lenses from the rear to the front is such that the built-up portion 16 will not lie within the limit of the field of vision as established by the inner contour edge 17 of the rims.

In Fig. 3 there is shown a modified form of lens rim which in addition to having the rear bevelled surface 19 of the groove in the rim increased greatly over the front bevel 20 has an integral flange-like portion 21 overlying the rear side surface of the lens. This affords greater resistance to impact directed to the front of the lenses. It is particularly pointed out that the dimension of the bevelled surface 20 is no less than the conventional dimension of similarly bevelled rims of the prior art while on the other hand the dimension of the bevel 19 is greatly increased over that usual in prior art mountings of this nature so as to afford greater resistance to impact directed to the front of the lenses.

In each of the showings of Figs. 2 and 3, the dimension of the rear surfaces 14 and 19 respectively of the V groove in the rims is so controlled as to overlie more than half of the adjacent edge surface of the lens.

The dash lines 22 in Fig. 2 diagrammatically illustrate the smallest dimensional thickness of conventional lenses while the full lines 23 diagrammatically illustrate the greatest dimensional thickness of lenses used with mountings of the character described. While the dimension B is described as being greater than half that of the edge surface area of the adjacent portion of the bevelled edge 13 of the lens, it is pointed out that the dimension C is substantially half or only slightly less than half of the adjacent edge thickness of the lens of greatest thickness dimension as illustrated by full lines 23—23 and in no instance is less than half the width of the adjacent surface 15 of said bevelled edge 13 when a lens of the smallest thickness dimension as illustrated by dash lines 22—22 is used. The vertical center line of the apex of the V-shaped groove in the rim is illustrated by the dash line 18. It is always positioned forwardly of the vertical center line D of the rim so that the rim, in the rear of the dash line 18 has a greater cross sectional area than the area of the portion of the rim in front of said line.

The reason for the above arrangement is to insure that the V-shaped groove 12 in the rim 5 will have sufficient area contact with the opposed bevelled edge surfaces of the lens to hold the lens against accidental displacement from the rims from either a front or rearward direction. The increased thickness dimension of the rear section of the rim as set forth above in combination with the increased surface contacting area of the rear portion 14 of the groove in the rim is to afford much greater resistance to impact directed to the front of the lens.

Prior art mountings of the type having a front comprising bridge and endpiece members formed integrally with the rims were usually intended for general street wear and were required to have a slender delicate appearance in order to be desirable from the aesthetical view point. Although the dimensional characteristics of such mountings, in view of the intended use thereof were practical for general use they would not afford protection and resistance to abuse to which mountings of the type embodying the invention would be subjected.

In addition to increasing the strength of the mounting at strategic points as set forth above, applicant has so dimensioned the bridge and endpiece members as to provide an increased shielding effect for the eyes or the adjacent area of the eyes of the wearer.

The hinge members 9 as shown in Fig. 4, due to the increased size of the endpiece member may be increased dimensionally over those of the prior art type so as to render the said hinge members more resistant to wear and distortion. The hinge members comprise pivotally connected plate members 24 and 25 joined with the endpieces 7 and temples 8 respectively by rivets or the like 26 and 27.

The front, adjacent the nasal sides of the rims 5 is provided with integrally connected nose bearing pads 28. Said pads 28 have a side surface contact with the nose and are so dimensioned and related as to provide a comfortable fit with adjacent facial chcaracteristics of most individuals.

Under actual tests, it has been proven that the mounting as constructed above has a much greater resistance to impact directed to the front of the lenses than prior art mountings.

From the foregoing description, it will be seen that simple, efficient, and economical means have been provided for accomplishing all of the objects and advantages of the invention.

Having described my invention, I claim:

1. An ophthalmic mounting comprising a pair of lenses having beveled edges with the apices of the bevels being substantially centrally of the edges of said lenses and with the angles of said beveled surfaces on the opposed sides of a plane intersecting said apices being substantially equal, with the total angle between said surfaces being greater than a right angle and a frame support for said lenses, said frame support embodying a pair of continuous undivided lens rims for surrounding the lenses, said lens rims being formed of non-metallic expandable and contractible material having continuous beveled grooves therein with the angular relation of the walls of the grooves being substantially equal to the angular relation of the beveled edge surfaces of the lenses, the front beveled surfaces of the grooves being of a width less than the width of the adjacent surfaces of the lenses but of a width sufficient to cover at least approximately half of said adjacent beveled surfaces of the lenses and the rear beveled surfaces of the grooves being of a width to cover more than half of the adjacent edge surfaces of the lenses, with the thickness of the rims forwardly of the apieces of the grooves being greater than half of the thickness of the rims rearwardly of said apices and with the continuous inner edges of the front surfaces of the beveled grooves each being of a circumferential dimension which is greater than the circumferential dimension of the inner edges of the rear surfaces of the grooves.

2. An ophthalmic mounting comprising a pair of lenses having beveled edges with the apices of the bevels being substantially centrally of the edges of said lenses and with the angle between said beveled surfaces being greater than a right angle and a frame support for said lenses, said frame support embodying a pair of lens rims for surrounding the lenses, said lens rims being formed entirely of non-metallic expandable and contractible material and each having a continuous beveled groove therein with the angular relation of the walls of the groove being substantially equal to the angular relation of the beveled edge surfaces of the lenses, the front beveled surfaces of the grooves being of a width less than the width of the adjacent beveled surfaces of the lenses but of a width sufficient to cover at least approximately half of said adjacent beveled surfaces of the lenses and the rear beveled surfaces of the grooves being of a width to cover more than half of the adjacent edge surfaces of the lenses, with the thickness of the rims forwardly of the apices of the grooves being greater than half of the thickness of the rims rearwardly of said apices and with the continuous inner edges of the front surfaces of the beveled grooves each being of a circumferential dimension which is greater than the circumferential dimension of the inner edges of the rear surfaces of the grooves.

DANIEL P. BERNHEIM.